United States Patent
Fujioka

(10) Patent No.: US 10,000,092 B2
(45) Date of Patent: Jun. 19, 2018

(54) PNEUMATIC TIRE

(71) Applicant: TOYO TIRE & RUBBER CO., LTD., Osaka-shi, Osaka (JP)

(72) Inventor: Tsuyoshi Fujioka, Osaka (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 67 days.

(21) Appl. No.: 15/052,288

(22) Filed: Feb. 24, 2016

(65) Prior Publication Data

US 2016/0250897 A1     Sep. 1, 2016

(30) Foreign Application Priority Data

Feb. 27, 2015    (JP) ................................. 2015-038305

(51) Int. Cl.
   *B60C 11/03* (2006.01)
   *B60C 11/12* (2006.01)

(52) U.S. Cl.
   CPC ....... *B60C 11/0306* (2013.01); *B60C 11/1259* (2013.01); *B60C 2011/039* (2013.01); *B60C 2011/0346* (2013.01); *B60C 2011/0351* (2013.01); *B60C 2011/0353* (2013.01); *B60C 2011/0362* (2013.01)

(58) Field of Classification Search
   CPC ..... B60C 2011/0351; B60C 2011/1209; B60C 2011/0362
   See application file for complete search history.

(56) References Cited

U.S. PATENT DOCUMENTS

| | | | | |
|---|---|---|---|---|
| 9,434,215 B2* | 9/2016 | Tanaka | ................ | B60C 11/0306 |
| 9,643,457 B2* | 5/2017 | Tanaka | ................ | B60C 11/1272 |
| 2002/0100526 A1* | 8/2002 | Matsumoto | ......... | B60C 11/0306 |
| | | | | 152/209.18 |
| 2009/0283188 A1* | 11/2009 | Itoh | ..................... | B60C 11/0309 |
| | | | | 152/209.18 |
| 2010/0096060 A1* | 4/2010 | Suzuki | .................. | B60C 9/2006 |
| | | | | 152/531 |
| 2012/0168048 A1* | 7/2012 | Suganuma | .............. | B60C 11/04 |
| | | | | 152/209.18 |

(Continued)

FOREIGN PATENT DOCUMENTS

| | | |
|---|---|---|
| JP | 8-192607 A | 7/1996 |
| JP | 2002321508 A * | 11/2002 |

(Continued)

*Primary Examiner* — Jodi C Franklin
(74) *Attorney, Agent, or Firm* — Westerman, Hattori, Daniels & Adrian, LLP

(57) ABSTRACT

A pneumatic tire has a first shallow groove extending in a zigzag manner at the shoulder rib and second shallow grooves extending in the tire width direction and arranged at regular intervals in the tire circumferential direction at inner mediate ribs and center rib or ribs. A wall of each section divided by the second shallow grooves includes a central wall surface extending from one end on an interior widthwise of a center main groove to an other end on an exterior widthwise of the center main groove, a first wall surface extending from the one end of the central wall surface, and a second wall surface extending from the other end of the central wall surface. The first wall surfaces of the inner mediate ribs and the first wall surfaces of the center rib or ribs are mutually opposed across the center main groove.

8 Claims, 6 Drawing Sheets

(56) References Cited

U.S. PATENT DOCUMENTS

| | | | |
|---|---|---|---|
| 2012/0305155 A1* | 12/2012 | Hamanaka | B60C 11/11 152/209.18 |
| 2013/0105052 A1* | 5/2013 | Tanaka | B60C 11/0306 152/209.17 |
| 2014/0230979 A1* | 8/2014 | Matsuda | B60C 11/12 152/209.18 |
| 2014/0230983 A1* | 8/2014 | Tagashira | B60C 11/1259 152/209.23 |
| 2014/0230984 A1* | 8/2014 | Miyazaki | B29D 30/66 152/450 |
| 2014/0326375 A1* | 11/2014 | Okabe | B60C 9/0007 152/154.2 |
| 2014/0326380 A1* | 11/2014 | Kotoku | B60C 9/0007 152/209.18 |
| 2015/0007917 A1* | 1/2015 | Tanaka | B60C 11/0306 152/209.8 |
| 2015/0151581 A1* | 6/2015 | Kunugi | B60C 11/0083 152/209.18 |
| 2015/0251496 A1* | 9/2015 | Yamaguchi | B60C 11/01 152/209.18 |
| 2015/0352902 A1* | 12/2015 | Takei | B60C 11/0306 152/209.25 |
| 2015/0352905 A1* | 12/2015 | Tanaka | B60C 11/1272 152/209.18 |
| 2016/0152089 A1* | 6/2016 | Matsuda | B60C 11/1369 152/209.22 |
| 2016/0347125 A1* | 12/2016 | Itou | B60C 11/04 |

FOREIGN PATENT DOCUMENTS

| | | | | |
|---|---|---|---|---|
| JP | 2003-2014 A | | 1/2003 | |
| JP | 2004-314787 A | | 11/2004 | |
| JP | 2004314787 A | * | 11/2004 | |
| JP | 2005280457 A | * | 10/2005 | B60C 11/0309 |
| JP | 2009-1171 A | | 1/2009 | |

* cited by examiner

PNEUMATIC TIRE

BACKGROUND OF THE INVENTION

Field of the Invention

The present invention relates to a pneumatic tire including a rib pattern on a tread surface.

Description of the Related Art

A tread surface of a pneumatic tire is provided with a plurality of main grooves continuously extending in a tire circumferential direction, and land parts such as ribs or blocks, which are divided by the main grooves, to form various tread patterns depending on required tire performance and use conditions. Because the rib has higher stiffness than the block, to enhance irregular wear resistance, a rib pattern is superior to a block pattern. However, the rib pattern tends to have lower traction performance and skid resistance than the block pattern.

Patent Documents 1, 2 disclose a pneumatic tire employing the rib pattern, but fail to suggest a means for counteracting a decrease in skid resistance in the rib pattern. Further, Patent Documents 3, 4 also disclose a pneumatic tire employing the rib pattern. However, a rib provided at the center in the tire width direction has relatively high ground pressure and thus, can be greatly deformed. Accordingly, there is a room for improvement of irregular wear resistance.

PRIOR ART DOCUMENT

Patent Document

Patent Document 1: JP-A-8-192607
Patent Document 2: JP-A-2003-2014
Patent Document 1: JP-A-2004-314787
Patent Document 1: JP-A-2009-1171

SUMMARY OF THE INVENTION

The present invention has been made in view of the above actual circumstances, and an object thereof is to provide a pneumatic tire employing a rib pattern, which can ensure traction performance and skid resistance and enhance irregular wear resistance.

The object can be achieved by the following present invention. The present invention provides a pneumatic tire comprising a tread surface, six to eight of main grooves continuously extending in a tire circumferential direction in the tread surface, and a plurality of ribs divided by the main grooves, wherein provided in order from an exterior to an interior in a tire width direction there are shoulder ribs, shoulder main grooves, outer mediate ribs, mediate main grooves, inner mediate ribs, center main grooves, and center rib or ribs, the shoulder main grooves being straight grooves, the center main grooves being zigzag grooves, there being one to three of the center rib or ribs, there being two to four of the center main grooves, and the center rib or ribs being arranged between respective pair or pairs of the center main grooves, wherein a first shallow groove continuously extending in the tire circumferential direction in a zigzag manner is formed in the shoulder rib, second shallow grooves that extend in the tire width direction and are arranged at regular intervals in the tire circumferential direction are formed in each of the inner mediate ribs and the center rib or ribs, and a depth of each of the first and second shallow grooves is set to be in a range of 10% to 40% of a depth of the main grooves, wherein a wall of each section resulting from division by the second shallow grooves includes a central wall surface that is located at a center of the section in the tire circumferential direction and extends in the tire width direction from one end thereof on an interior widthwise of the center main groove to an other end thereof on an exterior widthwise of the center main groove, a first wall surface that extends in the tire circumferential direction from the one end of the central wall surface, and a second wall surface that extends in the tire circumferential direction from the other end of the central wall surface, and wherein the first wall surfaces of the inner mediate ribs and the first wall surfaces of the center rib or ribs are mutually opposed across the center main groove.

The shoulder main grooves provided on the outermost in the tire width direction among the six to eight main grooves provided in the tread surface are straight grooves, which is advantageous for enhancing irregular wear resistance. When the shoulder main grooves are zigzag grooves, corners of the shoulder ribs and the outer mediate ribs can become starting points of irregular wear. The center main grooves provided at the center in the tire width direction, which greatly contribute to traction performance, are zigzag grooves, which can ensure traction performance.

The shoulder rib most subjected to lateral force has the first shallow groove as described above, ensuring traction performance as well as skid resistance. The first shallow groove extends in a zigzag manner to respond to lateral forces in multiple directions including diagonal directions. Further, the second shallow grooves formed in the inner mediate ribs and the center rib (s) can also ensure traction performance. The fact that the depth of the shallow grooves is 10% or more of the depth of the main groove is advantageous for ensuring traction performance and skid resistance, and that the depth of the shallow grooves is 40% or less of the depth of the main groove is advantageous for suppressing deformation of the ribs to improve irregular wear resistance.

In the pneumatic tire, since the first wall surfaces in the inner mediate rib and the center rib (s) are opposed to each other across the center main groove, the ribs support each other during travelling. This can suppress deformation of the ribs at the center in the tire width direction, which has relatively high ground pressure, effectively enhance irregular wear resistance. The reason why the first wall surfaces are mutually opposed rather than that the first wall surface is opposed to the second wall surface is that, in the wall of each section divided by the second shallow grooves, the first wall surface deforms toward the center main groove more easily than the second wall surface.

It is preferable that there are two or three of the center ribs, pairs of the first wall surfaces of respective pair or pairs of the center ribs being mutually opposed across the center main groove or grooves. With such a configuration, deformation of the ribs between the center ribs as well as between the inner mediate rib and the center ribs can be suppressed to enhance irregular wear resistance more effectively.

It is preferable that third shallow grooves that extend in the tire width direction and are arranged at regular intervals in the tire circumferential direction are formed in the shoulder rib, the third shallow grooves branching toward the interior in the tire width direction from the first shallow groove, and opening to the shoulder main groove. With such a configuration, the shoulder rib most subjected to lateral forces can have higher traction performance.

It is preferable that sipes arranged at intervals in the tire circumferential direction and extending in the tire width direction from a rib interior to reach the main groove are provided in each of the shoulder ribs, but are not provided in the inner mediate ribs and are not provided in the center rib or ribs. With such a configuration, grounding performance of the shoulder ribs located at both ends in the tire width direction, which have relatively low ground pressure, can be improved to enhance irregular wear resistance while suitably ensuring traction performance. Moreover, since such sipes are not provided in the inner mediate ribs and the center rib(s) at the center in the tire width direction, which have relatively high ground pressure, no defect, such as a crack in the bottom of the sipe and a breakage of the rib between the sipes, occurs.

DETAILED DESCRIPTION OF THE PREFERRED EMBODIMENTS

An embodiment of the present invention will be explained with reference to the drawings.

Figure 1:
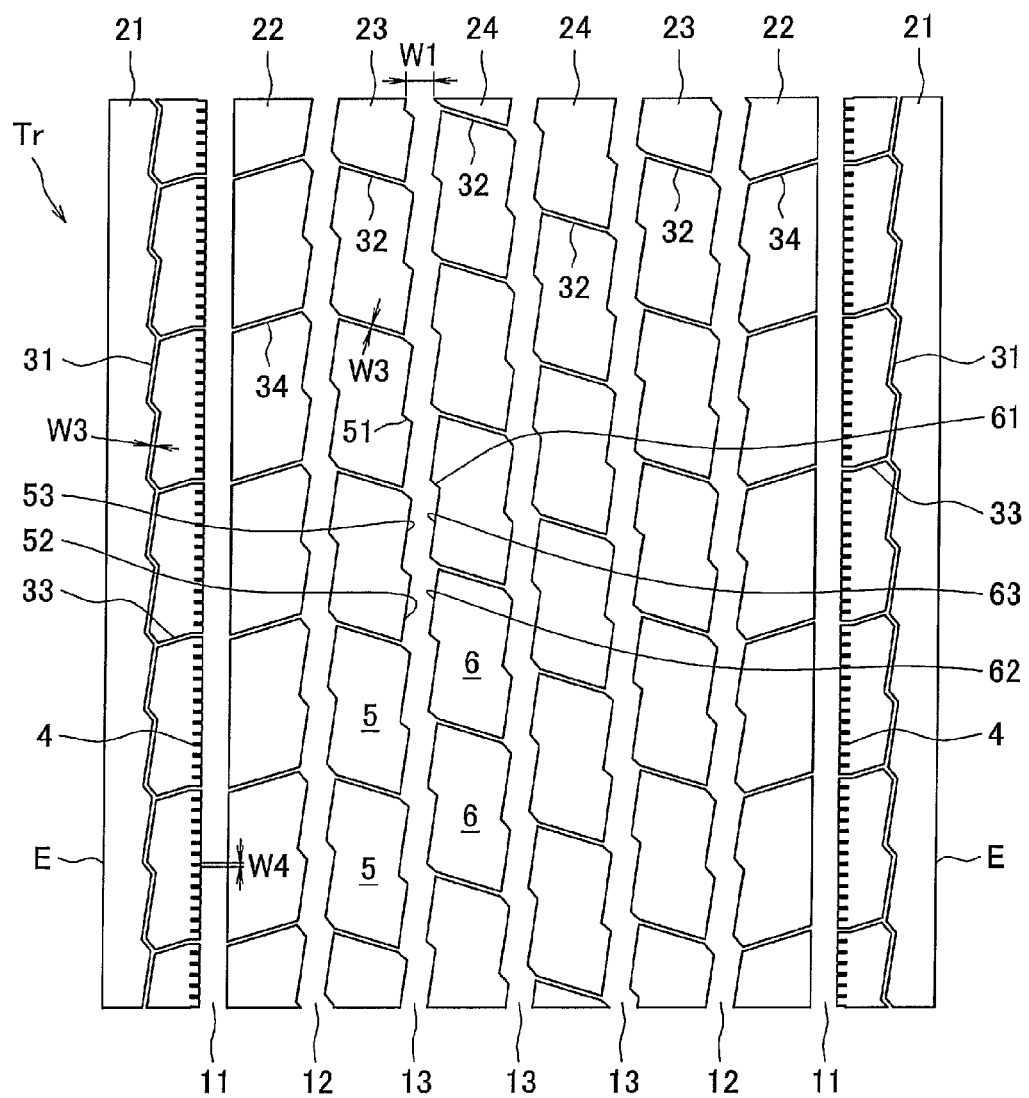
FIG. 1 is an exploded plan view illustrating an example of a tread surface of a pneumatic tire according to the present invention.

As illustrated in FIG. 1, in this embodiment, seven main grooves continuously extending in a tire circumferential direction and a plurality of ribs divided by the main grooves are provided in a tread surface Tr. In this tread surface Tr, shoulder ribs 21, shoulder main grooves 11, outer mediate ribs 22, mediate main grooves 12, inner mediate ribs 23, center main grooves 13, and center ribs 24 are provided from both exterior to interior in a tire width direction in this order.

The seven main grooves are configured by a pair of the shoulder main grooves 11 provided on the outermost in the tire width direction, a pair of the mediate main grooves 12 each provided between the shoulder main groove 11 and the center main groove 13, and the center main grooves 13 provided at the center in the tire width direction. The three center main grooves 13 are provided, and the central center main groove 13 passes a tire equator. The shoulder main grooves 11 are straight grooves, and the center main grooves 13 are zigzag grooves. In this embodiment, the mediate main grooves 12 are also zigzag grooves.

Eight ribs divided by the seven main grooves are configured by a pair of the shoulder ribs 21 each provided between a tread end E and the shoulder main groove 11, a pair of the outer mediate ribs 22 each provided between the shoulder main groove 11 and the mediate main groove 12, a pair of the inner mediate ribs 23 each provided between the mediate main groove 12 and the center main groove 13, and the center ribs 24 provided between the center main grooves 13. In this embodiment, the two center ribs 24 are arranged between respective pairs of the three center main grooves 13.

A shallow groove 31 (first shallow groove) continuously extending in the tire circumferential direction in a zigzag manner is formed in the shoulder rib 21. The shallow groove 31 passes the center of the shoulder rib 21 in the tire width direction. Thus, a portion between the shallow groove 31 and the tread end E can be prevented from becoming a so-called sacrificial rib. In a case where the shallow groove 31 is formed near the shoulder main groove 11, in connection with below-mentioned sipes 4, a ground pressure around the edge of the shoulder rib 21 can become excessively high. However, a configuration in which the shallow groove 31 passes the center of the shoulder rib 21 as in this embodiment can eliminate the possibility of such excessive high pressure, improving irregular wear resistance.

Shallow grooves 32 (second shallow groove) that extend in the tire width direction and arranged at regular intervals in the tire circumferential direction are formed in each of the inner mediate ribs 23 and the center ribs 24. The shallow grooves 32 are inclined with respect to the tire width direction, but may be parallel to the tire width direction. A depth of each of the shallow grooves 31, 32 is set to be 10% to 40% of a depth of the main groove. However, in view of enhancing irregular wear resistance, the depth is preferably, set to be 30% or less of the depth of the main groove. The depth of the main groove is found as a depth of the main groove to which the shallow groove is opened. The depth of each of the shallow grooves 31, 32 is smaller than a depth of the sipe 4.

A width W3 of the shallow grooves 31, 32 is preferably, in a range of 5% to 25% of a width W1 of the main groove to which the shallow grooves are opened. When the width W3 is 5% or more, traction performance and skid resistance can be effectively ensured, and when the width W3 is 25% or less, a decrease in stiffness of the ribs can be suppressed to enhance irregular wear resistance. The width W3 of the shallow grooves 31, 32 is preferably, 1.8 mm or more, and more preferably, 2.0 mm or more. The width W3 is larger than a width W4 of the sipe 4.

Figure 2:
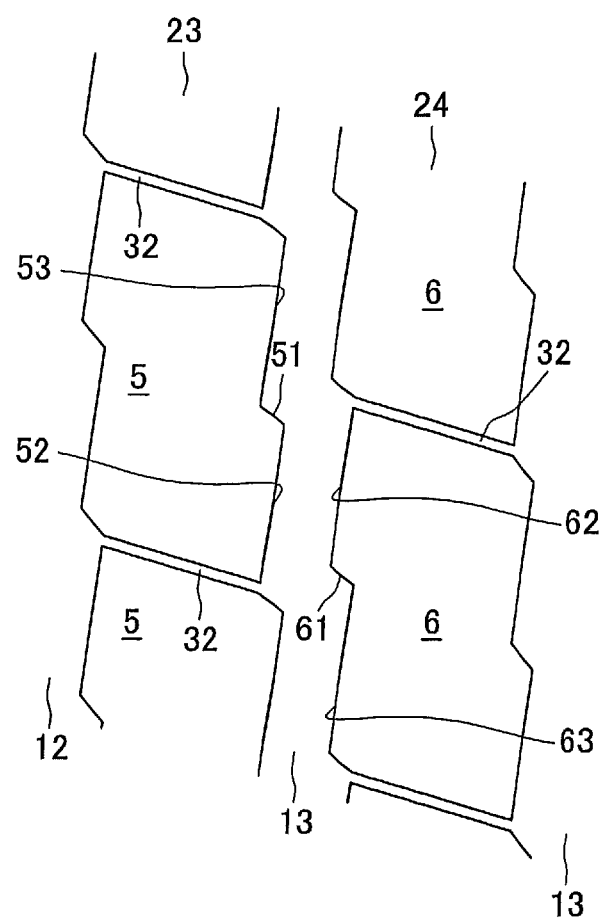
FIG. 2 is an enlarged view illustrating a main part of the tread surface in FIG. 1.

Each of the shallow grooves 32 is both-sides-open groove completely transversing the corresponding rib, and surfaces of the inner mediate ribs 23 and the center ribs 24 are each divided into a plurality of sections 5, 6 by the shallow grooves 32. The sections 5, 6 in each of the inner mediate ribs 23 and the center ribs 24 have the same shape. The shallow grooves 32 are arranged at the same pitch in the inner mediate ribs 23 and the center ribs 24. The sections 5 in the inner mediate ribs 23 and the sections 6 in the center ribs 24 are shown in FIG. 2. These sections have the same shape.

A wall of the each section 5 resulting from division by the shallow grooves 32 includes a central wall surface 51, a wall surface 52 (first wall surface), and a wall surface 53 (second wall surface). The central wall surface 51 is located at the center of the section 5 in the tire circumferential direction, and extends in the tire width direction from one end thereof on an interior widthwise of the center main groove 13 (right side in FIG. 2) to an other end thereof on an exterior widthwise of the center main groove 13 (left side in FIG. 2). The central wall surface 51 is inclined with respect to the tire width direction, but may be parallel to the tire width direction. The wall surface 52 extends in the tire circumferential direction from the one end of the central wall surface 51, and the wall surface 53 extends in the tire circumferential direction from the other end of the central wall surface 51. The wall surfaces 52, 53 linearly extend, and are inclined with respect to the tire circumferential direction in the same way.

As described above, the wall of the section 5 that faces the center main groove 13 is formed of a wall surface that bends at both ends of the central wall surface 51 and extends into a crank shape, and the wall on the opposite side has the same configuration. The sections 6 in the center ribs 24 have the same shape as the sections 5. That is, a wall of the section 6 that faces the center main groove 13 includes a central wall surface 61 that extends in the tire width direction from one end thereof on an interior widthwise of the center main groove 13 (left side in FIG. 2) to the other end thereof on an exterior widthwise of the center main groove 13 (right side in FIG. 2), a wall surface 62 (first wall surface) that extends in the tire circumferential direction from the one end of the central wall surface 61, and a wall surface 63 (second wall surface) that extends in the tire circumferential direction from the other end of the central wall surface 61.

In the pneumatic tire, the first wall surfaces (that is, the wall surface 52 and the wall surface 62) of the inner mediate rib 23 and the center rib 24 are mutually opposed across the center main groove 13. The areas where the first wall surfaces are opposed to each other are provided in each of the sections 5, 6, and are arranged at regular intervals in the tire circumferential direction. The contours of the sections 5, 6 extend outward in the groove width direction of the center main groove 13 from both ends of the wall surfaces 52, 62, respectively. For this reason, in the section 5, the wall surface 52 deforms toward the center main groove 13 more easily than the wall surface 53, and in the section 6, the wall surface 62 deforms toward the center main groove 13 more easily than the wall surface 63.

In the tread surface Tr, the shoulder main grooves 11 are straight grooves to enhance irregular wear resistance. Further, the center main grooves 13 are zigzag grooves to ensure traction performance. The shallow grooves 31 formed in the shoulder ribs 21 can ensure skid resistance as well as traction performance. The shallow grooves 31 are zigzag grooves and thus, can respond to the case where lateral forces act upon the shoulder ribs 21 from multiple directions including diagonal directions. The shallow grooves 32 formed in the inner mediate ribs 23 and the center ribs 24 can also ensure traction performance.

Figure 3:
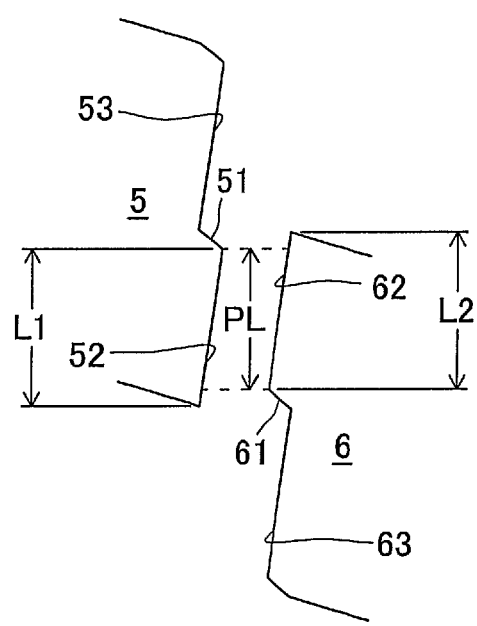
FIG. 3 is an enlarged view illustrating a main part of the tread surface in FIG. 1.

Further, since the first wall surfaces (that is, the wall surface 52 and the wall surface 62) are mutually opposed across the center main groove 13, the inner mediate rib 23 and the center rib 24 support each other during travelling. This can suppress deformation of the ribs at the center in the tire width direction, which has relatively high ground pressure, effectively enhance irregular wear resistance. To improve irregular wear resistance, a length PL illustrated in FIG. 3 is preferably, 70% or more of each of lengths L1, L2, more preferably, 80% or more, and most preferably, 90% or more. The length PL is a circumferential length, with which the opposed first wall surfaces (that is, the wall surface 52 and the wall surface 62) overlap when they reflect each other in the tire width direction, and the lengths L1, L2 are circumferential lengths of the wall surfaces 52, 62, respectively.

In this embodiment, the two center ribs 24 are provided, and as described above, pairs of the first wall surfaces of pair of the center ribs 24 are mutually opposed across the center main groove 13. With such a configuration, deformation of the ribs between the center ribs 24 as well as between the inner mediate rib 23 and the center rib 24 can be suppressed to enhance irregular wear resistance more effectively.

Further in this embodiment, shallow grooves 33 (third shallow groove) that extend in the tire width direction and are arranged at regular intervals in the tire circumferential direction are formed in the shoulder ribs 21. The shallow grooves 33 each branch toward the interior in the tire width direction from the shallow groove 31, and open to the shoulder main groove 11 to separate a part between the shallow groove 31 and the shoulder main groove 11. With such a configuration, in the shoulder ribs 21 mostly subjected to lateral forces, traction performance can be improved more suitably. The shallow grooves 33 are inclined with respect to the tire width direction, but may be parallel to the tire width direction. The preferable depth and width of the shallow grooves 33 are the same as those of the shallow grooves 31.

In this embodiment, shallow grooves 34 that extend in the tire width direction and are arranged at regular intervals in the tire circumferential direction are formed in the outer mediate rib 22. Each of the shallow grooves 34 is both-sides-open groove that completely transverses the corresponding rib, and the surface of the outer mediate rib 22 is divided by the shallow grooves 34. Thus, the outer mediate ribs 22 can also ensure traction performance. The preferable depth and width of the shallow grooves 34 are the same as those of the shallow grooves 31. The pitch of the shallow grooves 34 is set to be substantially the same as the pitch of the shallow grooves 32 and the shallow grooves 33.

In the tread surface Tr, the sipes 4 that are arranged at intervals in the tire circumferential direction and extend in the tire width direction from a rib interior to reach the main groove are provided in each of the shoulder ribs 21, but are not provided in the inner mediate ribs 23 and are not provided in the center ribs 24. For this reason, grounding performance of the shoulder ribs 21 can be improved to enhance irregular wear resistance while suitably ensuring traction performance. Further, in the inner mediate ribs 23 and the center ribs 24, no defect, such as a crack in the bottom of the sipe and a breakage of the rib between the sipes, occurs. The sipes 4 are not provided in the outer mediate ribs 22, but are provided only in the shoulder ribs 21 in this embodiment.

The sipes 4 each are formed by a one-side-open sipe that is too short to reach the shallow groove 31. A depth of the sipe 4 is preferably, 40% to 80% of a depth of the shoulder main groove 11 to which the sipe is opened. When the depth is 40% or more, irregular wear resistance can be suitably enhanced, and when the depth is 80% or less, a decrease in stiffness of a site around edges of the shoulder ribs 21 can be suppressed to prevent a breakage of the rib between the sipes. The width W4 of the sipe 4 is generally set to be 1.5 minor less, and 1.2 mm or less.

Figure 4:
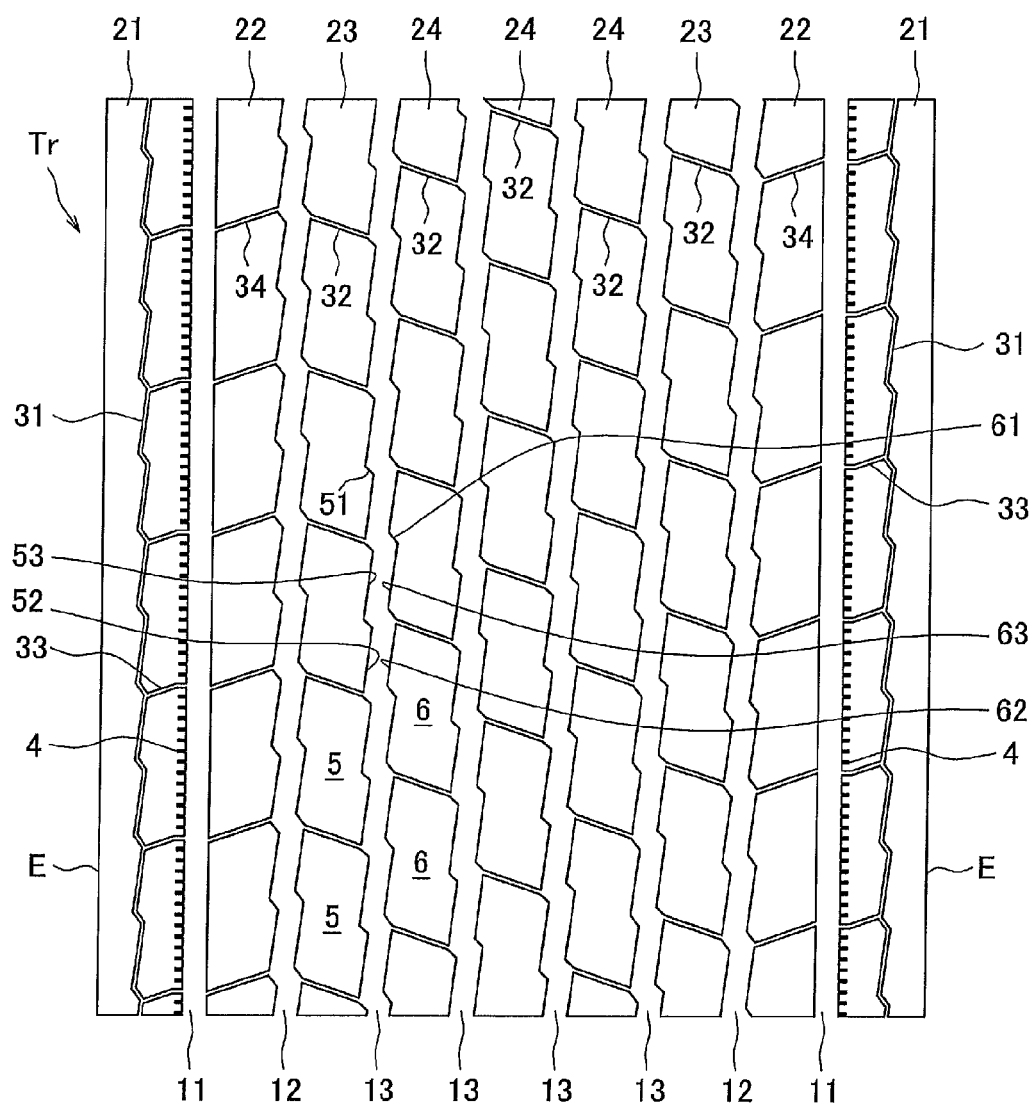
FIG. 4 is an exploded plan view illustrating an example of a tread surface provided with eight main grooves.
Figure 5:
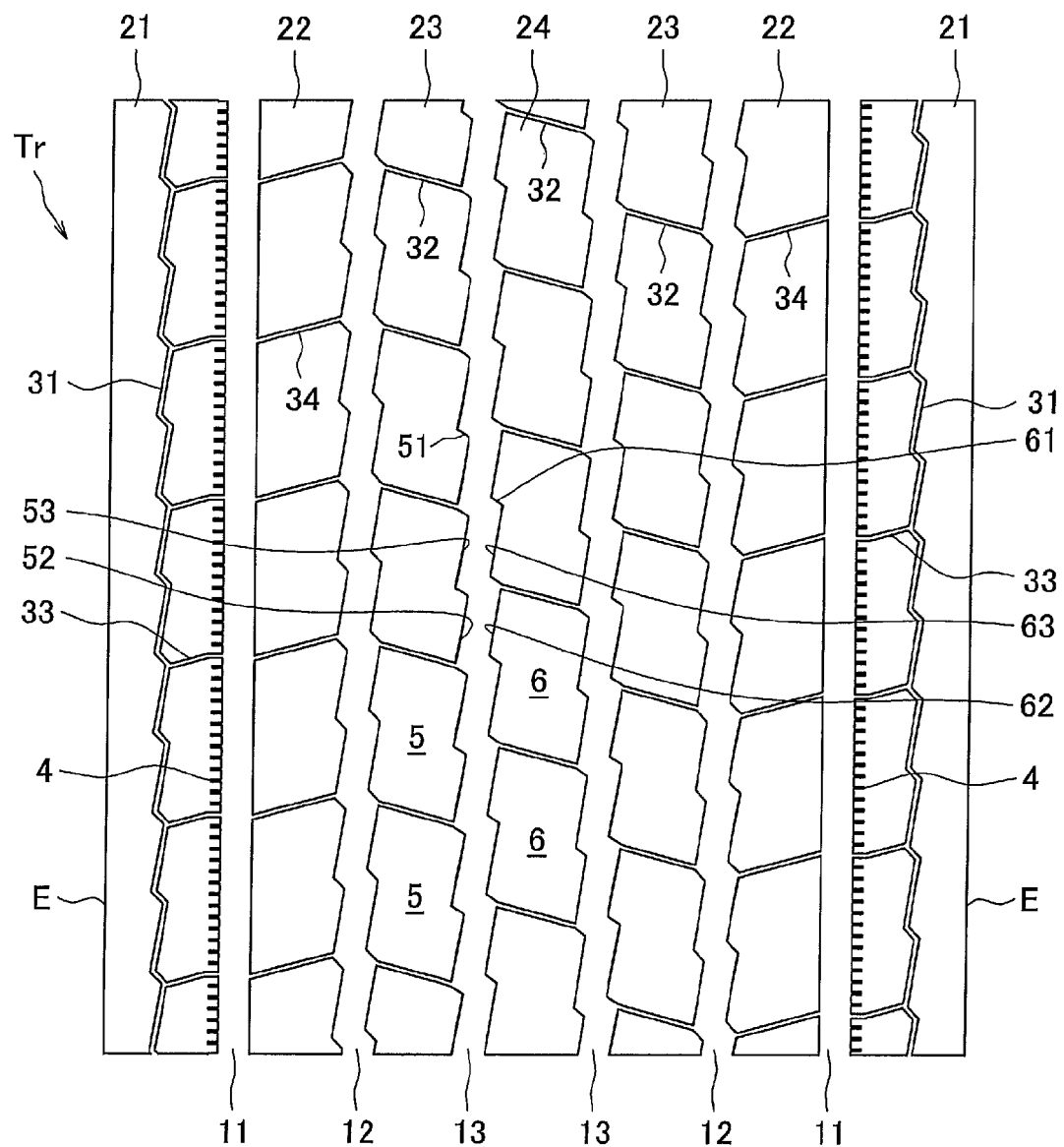
FIG. 5 is an exploded plan view illustrating an example of a tread surface provided with six main grooves.

FIG. 4 illustrates an example in which the tread surface Tr is provided with eight main grooves and nine ribs divided by the main grooves. FIG. 5 illustrates an example in which the tread surface Tr is provided with six main grooves and seven ribs divided by the main grooves. In both of the examples, as in the above embodiment, first wall surfaces in the inner mediate rib 23 and the center rib 24 are opposed to each other across the center main groove 13. In the example in FIG. 4, three center ribs 24 are provided, and pairs of the first wall surfaces of respective pairs of the center ribs 24 are mutually opposed across the center main grooves 13.

The pneumatic tire according to the present invention can be configured in the same manner as normal pneumatic tires except for the above-mentioned configuration of the tread surface and therefore, a well-known conventional material, shape, structure, and manufacturing method can be employed. Although not illustrated, the pneumatic tires in FIGS. 1, 4, and 5 include a pair of bead portions, side walls extending outward in the tire radial direction from the respective bead portions, and tread portion connected to outer radial ends of the respective side walls, and outer circumferential face of the tread portion form the tread surface Tr.

The pneumatic tire according to the present invention employs the rib pattern, and can ensure traction performance and skid resistance, and enhance irregular wear resistance and therefore, is advantageous as a heavy-loading pneumatic tire used for trucks or buses.

The present invention is not limited to the above embodiment, and various modifications can be made within the scope of the claims so as not to deviate from the subject matter of the present invention.

Examples

Examples specifically demonstrating configuration and effects of the present invention will be described below. In below-mentioned performance as sessments (1) to (3), a tire having a size of 385/65R22.5 was assembled to a rim of 22.5×11.75, and was filled with an inner pressure of 900 kPa and then, was attached to a semi-loaded vehicle (half of loadage), and assessments were made.

(1) Traction Performance

On a wet road in a depth of water of 1 mm, time during which a vehicle has moved forward by 20 m from its stopped state was measured, and its inverse number was calculated. Assessment was made based on an index using the result in Comparative example 1 as 100. A larger value represents shorter time of arrival and better traction performance.

(2) Skid Resistance

A vehicle was driven on a wet road in a depth of water of 1 mm at a speed of 40 km/h, and was braked and locked at the same time. Then, the attitude angle of the vehicle at the time when the vehicle completely stopped was measured, and its inverse number was calculated. Assessment was made based on an index using the result in Comparative example 1 as 100. A larger value represents a smaller angle, stable, behavior of the vehicle, and better skid resistance.

(3) Irregular Wear Resistance

The irregular wear state (heel-and-toe wear loss, shoulder wear loss, and center wear loss) after travelling of 20000 km was measured, and its inverse number was calculated. Assessment was made based on an index using the result in Comparative example 1 as 100. A larger value represents better irregular wear resistance.

Figure 6:
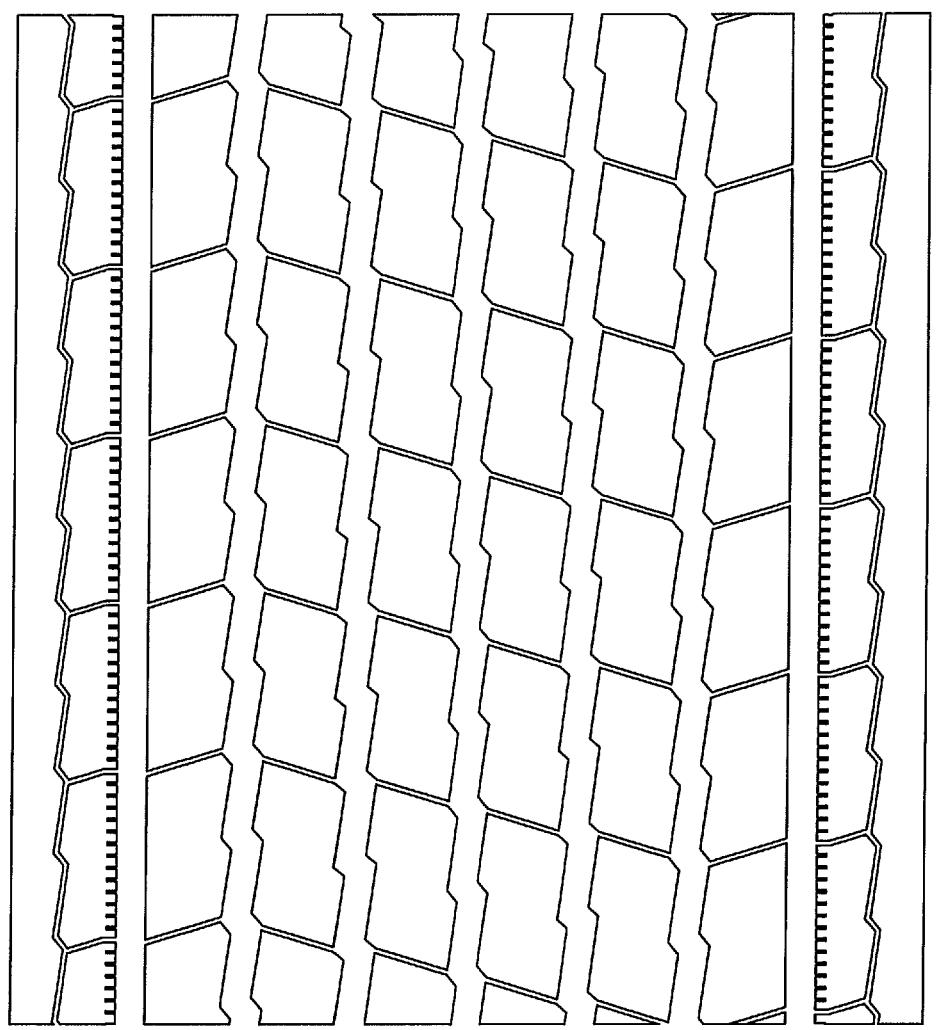
FIG. 6 is an exploded plan view illustrating a tread surface in Comparative example 1.

In Comparative examples 1, 2, as illustrated in FIG. 6, the first wall surfaces in the inner mediate rib and the center rib were not opposed to each other, and in Comparative example 1, no sipe was formed in the shoulder ribs. In Working examples 1, 2, as illustrated in FIG. 1, the first wall surfaces in the inner mediate rib and the center rib were opposed to each other, and in Working example 1, no sipe was formed in the shoulder ribs. Except for the tread pattern, tire structure such as tire internal structure and compounded rubber are common to the examples. Table 1 illustrates assessment results.

TABLE 1

|  | Comparative example 1 | Comparative example 2 | Working example 1 | Working example 2 |
| --- | --- | --- | --- | --- |
| Pattern | FIG. 6 (No sipe) | FIG. 6 | FIG. 1 (No sipe) | FIG. 1 |
| Traction Performance | 100 | 103 | 102 | 106 |
| Skid Resistance | 100 | 100 | 101 | 101 |
| Irregular wear resistance | 100 | 102 | 108 | 109 |

As illustrated in Table 1, in spite of employing the rib pattern, the tires in Working example 1, 2 have higher irregular wear resistance than the tires in Comparative examples 1, 2 while ensuring traction performance and skid resistance. Especially, the tire in Working example 2 is superior to the tire in Working example 1 in each performance.

What is claimed is:

1. A pneumatic tire comprising:

a tread surface;

six to eight of main grooves continuously extending in a tire circumferential direction in the tread surface; and a plurality of ribs divided by the main grooves, wherein provided in order from an exterior to an interior in a tire width direction there are shoulder ribs, shoulder main grooves, outer mediate ribs, mediate main grooves, inner mediate ribs, center main grooves, and a single center rib or a plurality of center ribs, the shoulder main grooves being straight grooves, the center main grooves being zigzag grooves, there being one to three of the single center rib or the plurality of center ribs, there being two to four of the center main grooves, and the single center rib or the plurality of center ribs being arranged between respective pair or pairs of the center main grooves, wherein a first shallow groove continuously extending in the tire circumferential direction in a zigzag manner is formed in the shoulder rib, second shallow grooves that extend in the tire width direction and are arranged at regular intervals in the tire circumferential direction are formed in each of the inner mediate ribs and the single center rib or the plurality of center ribs, and a depth of each of the first and second shallow grooves is set to be in a range of 10% to 40% of a depth of the main grooves, wherein a wall of each section resulting from division by the second shallow grooves includes a central wall surface that is located at a center of the section in the tire circumferential direction and extends in the tire width direction from one end thereof on an interior widthwise of the center main groove to an other end thereof on an exterior widthwise of the center main groove, a first wall surface that extends in the tire circumferential direction from the one end of the central wall surface, and a second wall surface that extends in the tire circumferential direction from the other end of the central wall surface, wherein the first wall surfaces of the inner mediate ribs and the first wall surfaces of the single center rib or the plurality of center ribs are mutually opposed across the center main groove, and wherein a width of the second shallow groove is in a range of 5% to 25% of a width of the main groove to which the second shallow groove is opened.

2. The pneumatic tire according to claim 1, wherein the plurality of center ribs comprises two or three center ribs, and wherein pairs of the first wall surfaces of respective pair or pairs of the center ribs are mutually opposed across the center main groove or grooves.

3. The pneumatic tire according to claim 1, wherein
third shallow grooves that extend in the tire width direction and are arranged at regular intervals in the tire circumferential direction are formed in the shoulder rib, the third shallow grooves branching toward the interior in the tire width direction from the first shallow groove, and opening to the shoulder main groove.

4. The pneumatic tire according to claim 1, wherein
sipes arranged at intervals in the tire circumferential direction and extending in the tire width direction from a rib interior to reach the main groove are provided in each of the shoulder ribs, but are not provided in the inner mediate ribs and are not provided in the single center rib or the plurality of center ribs.

5. The pneumatic tire according to claim 1, wherein the wall of each section resulting from division by the second shallow grooves is formed of a wall surface that bends at both ends of the central wall surface and extends into a crank shape.

6. The pneumatic tire according to claim 1, wherein a length PL is 70% or more of each of lengths LI, L2, when the length PL is a circumferential length, with which the opposed first wall surfaces overlap when they reflect each other in the tire width direction, and lengths L1, L2 are circumferential lengths of the opposed first wall surfaces.

7. The pneumatic tire according to claim 1, wherein a width of the first shallow groove is in a range of 5% to 25% of a width of the main groove to which the first shallow groove is opened.

8. The pneumatic tire according to claim 3, wherein a width of the third shallow groove is in a range of 5% to 25% of a width of the main groove to which the third shallow groove is opened.

* * * * *